(12) United States Patent
Wallace et al.

(10) Patent No.: US 9,295,202 B2
(45) Date of Patent: Mar. 29, 2016

(54) AUTOMATED CANOPY GREENHOUSE

(71) Applicants: David Wallace, Petrolia, CA (US);
Matthew Aaron Vallotton, Whitehorn, CA (US)

(72) Inventors: David Wallace, Petrolia, CA (US);
Matthew Aaron Vallotton, Whitehorn, CA (US)

( * ) Notice: Subject to any disclaimer, the term of this patent is extended or adjusted under 35 U.S.C. 154(b) by 38 days.

(21) Appl. No.: 14/079,997

(22) Filed: Nov. 14, 2013

(65) Prior Publication Data
US 2014/0157662 A1   Jun. 12, 2014

Related U.S. Application Data

(60) Provisional application No. 61/726,095, filed on Nov. 14, 2012.

(51) Int. Cl.
| | |
|---|---|
| *A01G 9/00* | (2006.01) |
| *A01G 9/14* | (2006.01) |
| *A01G 9/24* | (2006.01) |
| *A01G 9/20* | (2006.01) |
| *A01G 13/00* | (2006.01) |

(52) U.S. Cl.
CPC *A01G 9/14* (2013.01); *A01G 9/241* (2013.01); *A01G 9/20* (2013.01); *A01G 13/0231* (2013.01)

(58) Field of Classification Search
CPC ....... A01G 9/1438; A01G 9/16; A01G 9/227; A01G 9/241; A01G 9/242; A01G 9/26; A01G 13/02; A01G 13/0206; A01G 13/0212

USPC .......................... 47/17, 19.1–19.2, 22.1, 29.5
See application file for complete search history.

(56) References Cited

U.S. PATENT DOCUMENTS

| | | | |
|---|---|---|---|
| 4,062,146 A | 12/1977 | Grossman et al. | |
| 4,064,648 A * | 12/1977 | Cary | 47/17 |
| 4,067,347 A * | 1/1978 | Lipinski | 126/624 |
| 5,287,652 A | 2/1994 | Delp | |
| 5,802,762 A * | 9/1998 | Stonecypher | 47/17 |
| 2004/0134122 A1 * | 7/2004 | Van Bergen-Henegouwen et al. | 47/22.1 |

* cited by examiner

*Primary Examiner* — Joshua Huson
(74) *Attorney, Agent, or Firm* — Christopher Darrow; Darrow Law Office

(57) ABSTRACT

This disclosure is for an automated canopy greenhouse having a motor driven canopy that is pulled over curved arch supports. The greenhouse has a generally rectangular base framework to which the arches are attached, the outside of the structure having the general shape of a cylinder cut lengthwise and resting on its flat side. A canopy or tarp is wound around a drum positioned near the bottom of one of the long sides. A shuttle bar is attached to two trolleys each of which ride on an arch at each end of the greenhouse. The trolleys are motor driven. One end of the canopy is attached to the shuttle bar and closes or opens the greenhouse as the trolleys and shuttle bar are moved. Inside the drum there is a torsion spring that is preloaded to balance the load of the canopy and associated hardware as the canopy is being raised or lowered. Successive greenhouse units may be attached to a first greenhouse unit that has the motor, and tarps on the successive units may be closed or opened using the same motor.

11 Claims, 13 Drawing Sheets

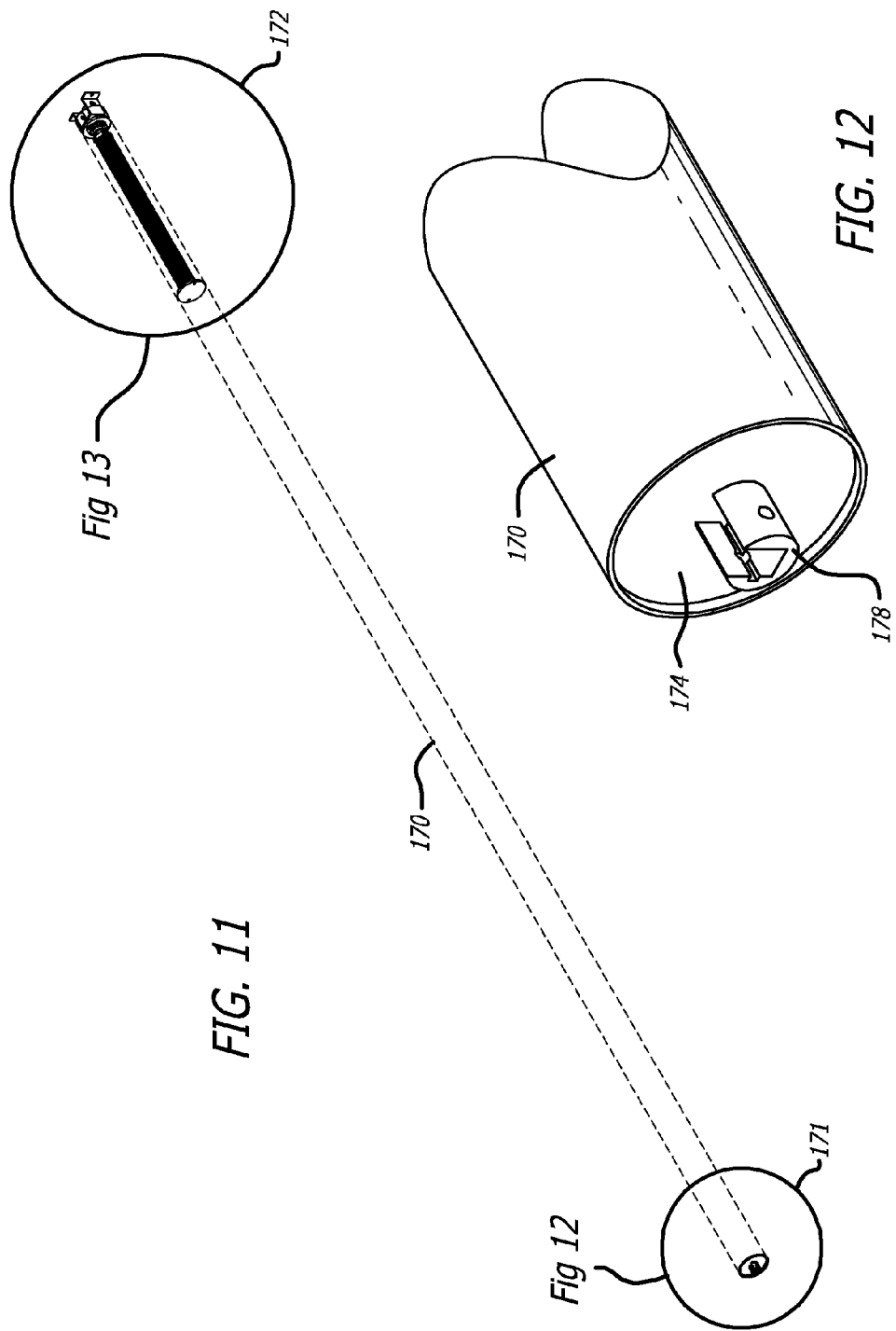

AUTOMATED CANOPY GREENHOUSE

RELATED APPLICATION

This application claims the benefit of and priority to U.S. Provisional Application Ser. No. 61/726,095, filed Nov. 14, 2012, the contents of which are incorporated by reference herein in their entirety.

FIELD OF THE DISCLOSURE

This disclosure is for an automated canopy greenhouse used to limit the amount of sunlight reaching the plants growing inside the greenhouse allowing for a controllable light deprivation schedule.

BACKGROUND OF THE DISCLOSURE

Since the dawn of time, farmers have understood the role of light in plant growth. However, not until the beginning of the twentieth century did they begin to understand the importance of darkness. In 1913, the French graduate student Julien Tournois discovered that hops and hemp grown under glass would flower precociously in winter. He also observed that the plants would flower most rapidly when allowed only six hours of daylight.

A few years later two American scientists, Wrightman Garner and Harry Allard, unwittingly expanded upon Tournois' findings. Wrightman and Allard discovered that certain plants bud more readily when they sense a change in seasons. More precisely, certain plants will begin to bud when they sense a change in the ratio of daylight hours to nighttime hours. Garner and Allard immediately saw the implications for agriculture. They began experimenting on a range of plant species and discovered that day length influences many aspects of plant activity, including dormancy, flowering, and potential yield. In 1920 they noted: "under the influence of a suitable length of day, precocious flowering and fruiting may be induced."

Garner and Allard invented a word to describe a plant's sensitivity to day length: Photoperiodism. Photoperiodism is a biological response to a shift in the proportions of light and dark in a 24-hour cycle. Photoperiodic plants measure hours of darkness in order to keep track of the seasons and thus flower at an appropriate time of year.

The two scientists began classifying plants as long-day plants (LDP), day-neutral plants (DNP), and short-day plants (SDP). Day-neutral plants can flower at any time of year, depending on other conditions. Long-day plants flower naturally in high summer, when the nights are shortest. Short-day plants flower naturally when the nights are long, either in early spring or in late summer and early autumn. Short-day species include chrysanthemums, poinsettias, cosmos, globe amaranth, rice, hyacinth bean, and some varieties of marigold, orchid, and strawberry, as well as a number of other high-value specialty crops.

Short-day is actually something of a misnomer: short-day plants sense darkness, not light. When sensors in a plant's leaves indicate that each 24-hour cycle includes 12 or more hours of sustained, uninterrupted darkness, the plant's apical meristems (growing tips) will shift priorities: instead of producing more leaves and stems, the plant will begin to produce floral structure.

In Photoperiodism in Plants, Thomas and Vince-Prue expand upon the concept as follows. "Perhaps the most useful proposal is that of Hillman (1969), who defined photoperiodism as a response to the timing of light and darkness. Implicit in this definition is that total light energy, above a threshold level, is relatively unimportant, as is the relative lengths of the light and dark period. What is important is the timing of the light and dark periods, or, to think of it another way, the times at which the transition between light and dark take place."

Biologist P. J. Lumsden also emphasized the importance of precise timing, noting: " . . . photoperiodic responses require a time-measuring mechanism, to which is closely coupled a photoperception system. Further, the time-keeping mechanism must operate very precisely and it must be insensitive to unpredictable variations in the environment."

In other words: absolute darkness is not necessary to trigger a photoperiodic response in SDP, but consistency of dark-to-light ratios is essential. During a 1938 experiment on the effects of light on xanthium, Karl Hamner and James Bonner discovered that the benefits of a long night could be reduced or abolished if the darkness was interrupted for even a few minutes. The converse was not true: the flowering process was not reversed when the daylight hours were interrupted with darkness.

Growers of SDP crops have been using light deprivation research to their advantage for decades. For example, poinsettia farmers use automated greenhouses to ensure that plants bloom for the Christmas season. More recently, light deprivation technology has caught on in other specialty gardening industries.

Light deprivation is an ideal method for farmers who want to bring a crop to market before the market floods during the harvest season. The method also allows farmers to avoid potential rain damage by harvesting when weather conditions are ideal. Perhaps more importantly, light deprivation offers the opportunity to plant and harvest twice during one growing season and thereby double annual yield.

To utilize light deprivation, farmers plant crops in hoop houses or greenhouses, which are covered with opaque material for a period of time each morning or evening. The goal is to block sunlight and increase the number of hours the crop spends in darkness: more than 12 hours of darkness will stimulate flower growth in most SDP plants. The challenge is to keep the schedule consistent and to ensure that the darkness is not interrupted, either by unseen rips in the covering, shifts in the covering caused by wind or human error. As Hamner and Bonner demonstrated, interruptions or inconsistencies in the light deprivation cycle can confuse the plant and slow flower growth.

Many light deprivation farmers still work manually, a less than ideal situation. Hiring workers to pull tarps leaves ample room for imprecision in timing, not to mention the high labor costs of paying two or more employees to spend several hours a day arduously tarping and untarping hoop houses. Controlling the amount of sunlight passing to the plants has been haphazard.

Applicant has solved that problem with a controllable canopy greenhouse. The applicant's device disclosed herein minimizes human error and scheduling problems to allow for precise timing and an easy, streamlined process that prevents rents and other forms of light leakage.

SUMMARY OF THE DISCLOSURE

Described herein is an automated canopy greenhouse used to limit the amount of sunlight reaching plants growing inside the greenhouse and allowing for a controllable light deprivation schedule. The automated greenhouse includes a base unit for supporting a tarp which is essentially impervious to sunlight. The base unit includes arched support members and is positioned over growing plants. In the preferred embodiment, the tarp is pulled over the arched support members using a shuttle attached to a motor. A torsion spring provides a counterforce to the weight of the tarp. An automatic timer may be provided. In an alternative embodiment, the tarp may be deployed or retracted utilizing a hand crank. Multiple units may be ganged together with the tarps being operated with one motor.

The accompanying diagrams and descriptions will aid in the visualization of the described features, and functionality of the device.

BRIEF DESCRIPTION OF THE DRAWINGS

FIG. 11 is the drum assembly of FIG. 4 shown in dashed lines with a near end detail shown as FIG. 12 and a far end detail shown as FIG. 13.

FIG. 12 is a perspective view of the near end of the drum showing a drum plug and a drum coupler.

DESCRIPTION OF THE DISCLOSED EMBODIMENT

Figure 1:
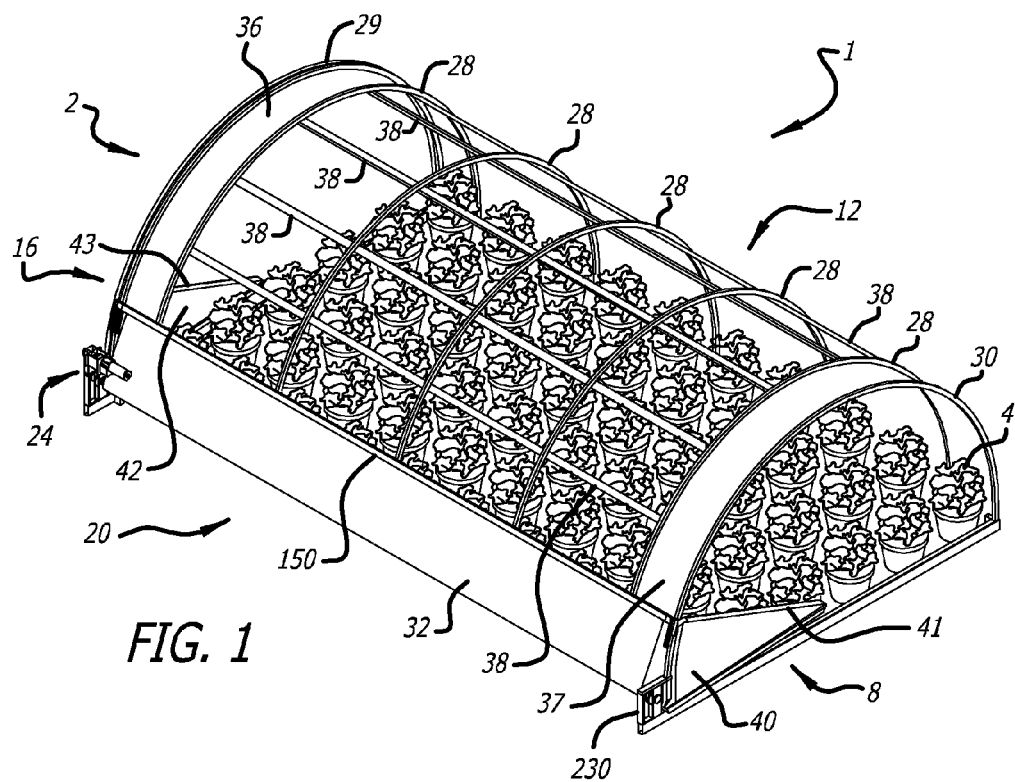
FIG. 1 is a perspective view of an embodiment of the automated canopy greenhouse in a fully opened configuration.

FIG. 1 is a perspective view of an embodiment of the automated canopy greenhouse 1 in a fully opened configuration. Shown is the base unit 2 within which are positioned plantings 4, which can be potted plants as shown in the figure, plants that are directly in the soil as on a farm, a hydroponic fixture or any other medium that supports plant growth. The base unit 2 has a far end 8, a far side 12, a near end 16 and a near side 20. The terms "near" and "far" are in relation to the proximity of a part or assembly to the motor assembly 24. These terms apply to the automated canopy greenhouse 1 and other greenhouse structures that may be attached to automated canopy greenhouse 1. Please see FIG. 18 which shows automated canopy greenhouse 1, greenhouse 3 and greenhouse 5. How the series of greenhouses cooperate with one another will be discussed below. Each of the greenhouses 1, 3 and 5 have a near end (closer to the motor assembly 24) and a far end (more distant to the motor assembly 24). If components within the greenhouses 1, 3 and 5 are referred to as having "near" and "far" portions, then the "near" side of a component is closer to the motor assembly 24 and the "far" side of a component is more distant to the motor assembly 24.

The base unit 2 includes a plurality of arches 28 that support a curtain or tarp 32. The overall shape of the base unit 2 as shown in FIG. 1 can be described as a cylinder cut longitudinally by a plane passing through a diameter of the cylinder. The flat part of the cut cylinder rests on the ground or other support surface and the curved part of the cylinder stands about the support surface. Modifications to this general shape can be made; for example, the semi-circular shape of a cylinder can be curved either more or less than a perfect semi-circle. In other words, the arches 28 may have a flatter or greater curvature than is shown. However, in the preferred embodiment the curvature of the arches 28 is generally semi-circular.

Also shown in FIG. 1 at the near end 16 is near end arch 29 and at the far end 8 is far end arch 30. Between near end arch 29 and its closest arch 28 is near end light baffle 36. Between far end arch 30 and its closest arch 28 is far end light baffle 37. The light baffles 36 and 37 limit the passage of light into the automated canopy greenhouse at its ends. Also supporting the tarp 32 are a plurality of longitudinal supports or purlins 38. In the preferred embodiment, the arches 28, purlins 38 and light baffles 36 and 37 are made of metal such as aluminum or steel, but other materials may be used so long as they provide sufficient strength to support themselves, the tarp 32 and the other components to be described below. The arches 28, purlins 38 and light baffles 36 and 37 may be attached to each other by any means that would be known to persons of ordinary skill in the art, such as welding, bolting, screwing, etc.

FIG. 1 also shows what appears to be a wedge at far end 8. This wedge is a portion of a far end tarp 40 that closes the far end 8 simultaneously as the tarp 32 is extended over the arches 28 and purlins 38. The far end tarp 40 is connected to far end tarp arm 41. Near end tarp 42 is similarly connected to near end tarp arm 43. The process for closing and opening the tarp 32, the far end tarp 41 and the near end tarp 42 will be described below.

Figure 2:
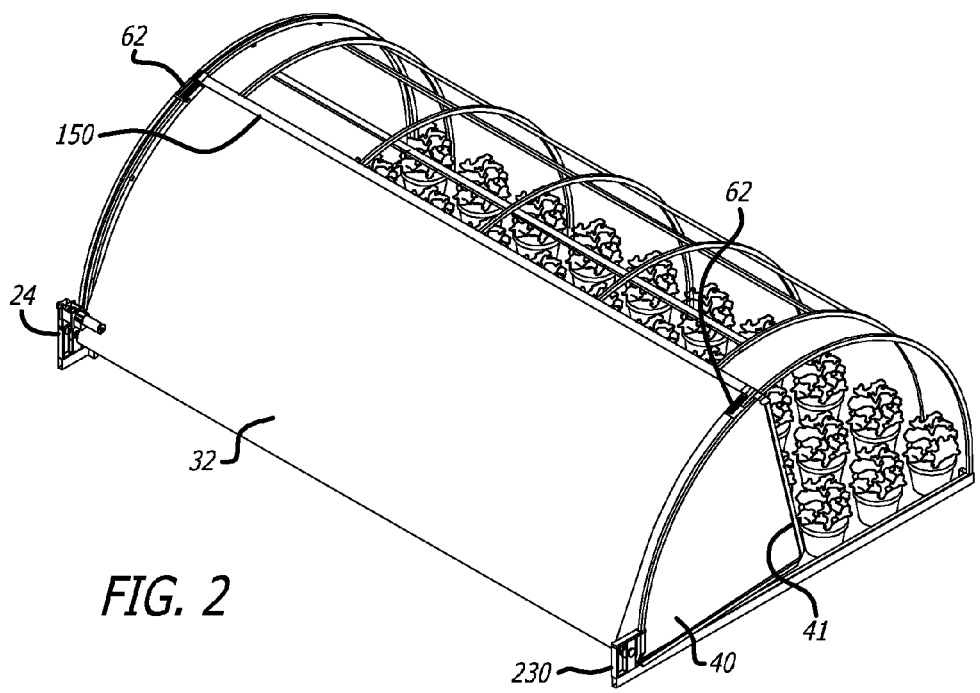
FIG. 2 is a perspective view of the embodiment of the automated canopy greenhouse having a curtain in a partially closed configuration.

FIG. 2 is a perspective view of the same embodiment of the automated canopy greenhouse 1 as shown in FIG. 1, however, having a curtain or tarp 32 in a partially closed configuration. Also shown as partially closed is far end tarp 40. Far end tarp 40 is connected to a far end tarp arm 41. The mechanism for closing and opening the tarps will be discussed below.

Figure 3:
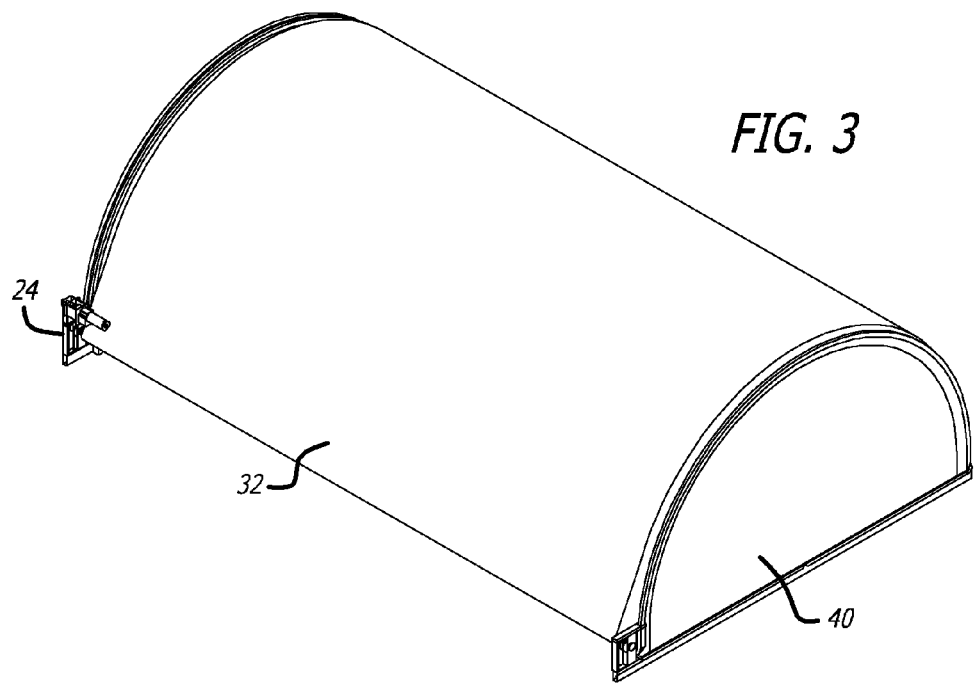
FIG. 3 is a perspective view of the embodiment of the automated canopy greenhouse having a curtain in a fully closed configuration.

FIG. 3 is a perspective view of the same embodiment of the automated canopy greenhouse 1 having a curtain 32 and far end tarp 40 in a fully closed configuration. In this configuration, the near end tarp 42 is also fully closed.

Figure 4:
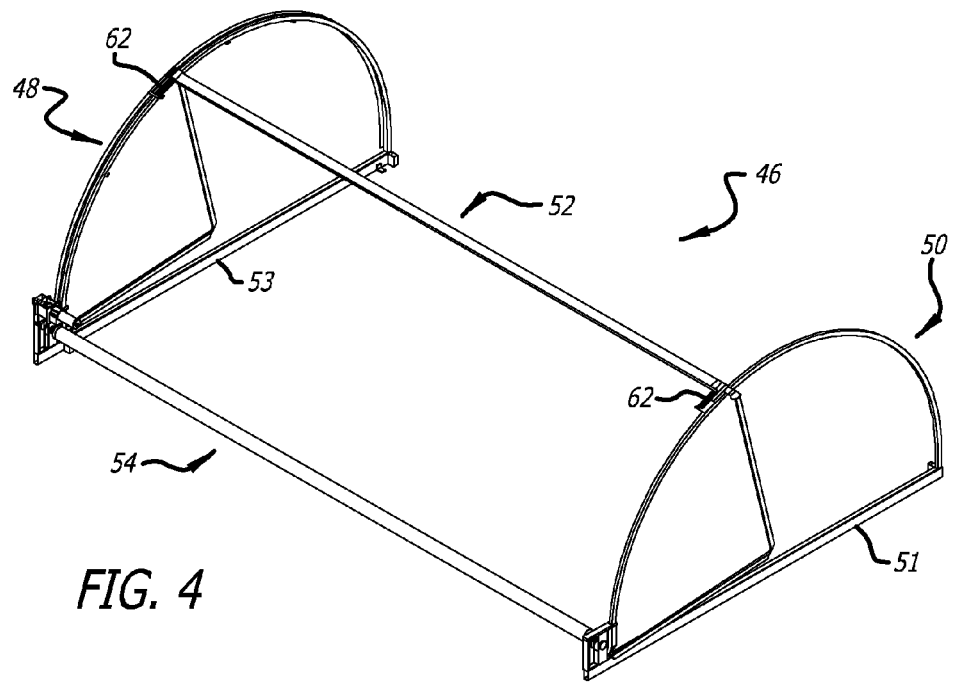
FIG. 4 is a perspective view of the drive frame assembly and shuttle assembly of the automated canopy greenhouse as they would appear in partially closed configuration without a curtain, and also showing a drum assembly.

FIG. 4 is a perspective view of the drive frame assembly 46, which includes a near drive frame 48, far drive frame 50, shuttle assembly 52 and drum assembly 54 of the automated canopy greenhouse 1 as these assemblies would appear in a partially closed configuration, without a curtain, in the approximate relative positions as shown in FIG. 2. Also shown is a far end base 51 and near end base 53. The components comprising these assemblies will be discussed below.

Figure 5:
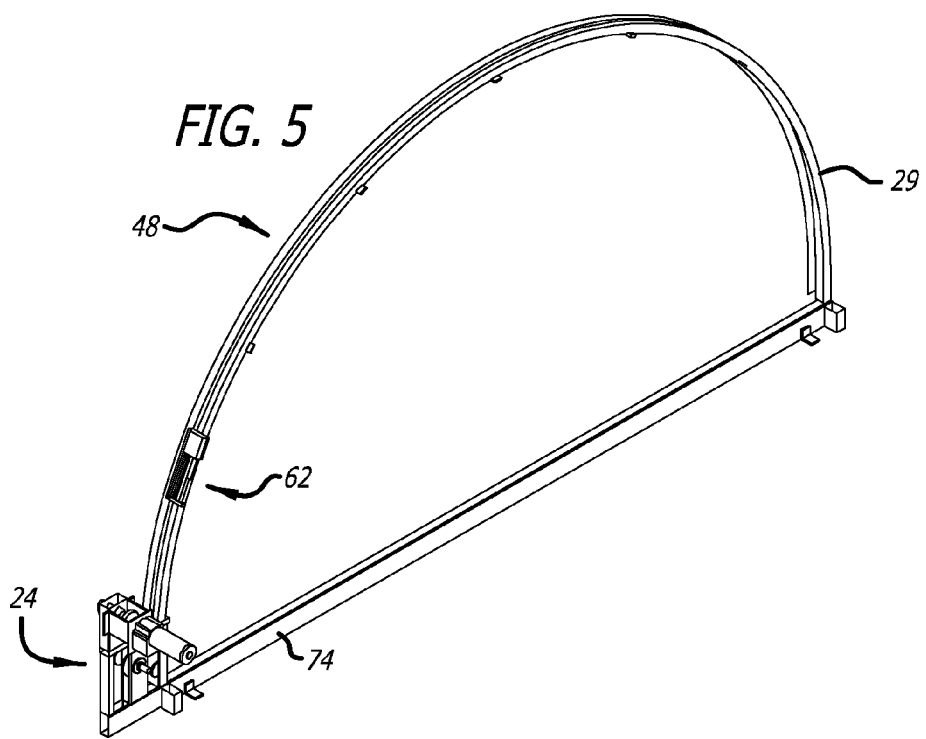
FIG. 5 is a perspective view of the near drive frame of FIG. 4 showing the relative positions of a motor assembly and trolley assembly attached to a portion of the drive frame.
Figure 6:
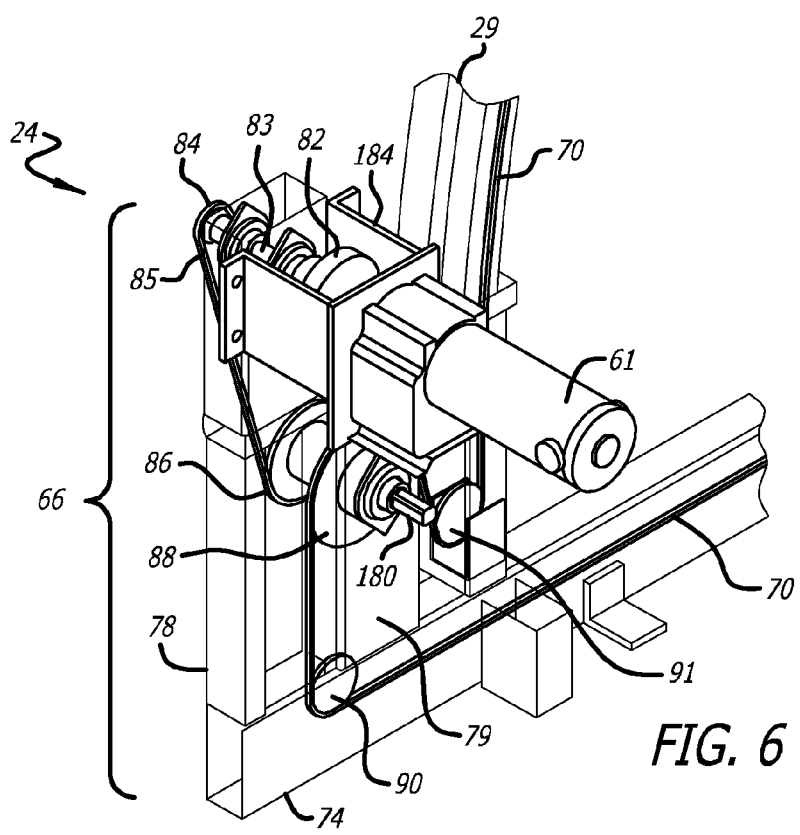
FIG. 6 depicts the motor assembly of FIG. 5 in greater detail.

FIG. 5 is a perspective view of the near drive frame 48 of FIG. 4 showing the relative positions of a motor assembly 24 and trolley assembly 62 attached to the near drive frame 48 as the trolley assembly would appear shortly after movement of the trolley assemble 62 had been initiated by the motor assembly 24. FIG. 6 depicts the motor assembly 24 of FIG. 5 in greater detail. A reversible electric motor 61 drives a gear train 66 which drives a trolley chain 70. The electric motor 61 can be one of several commercially available motors sized to have the torque necessary to drive the gear train 66 and trolley chain 70, as chosen by a person of ordinary skill in the art. The trolley chain 70 need not necessarily be a chain, but may be a cable or other closed loop of material. The gears in the gear train 66 may or may not have gear teeth depending on the type of cable or chain chosen. In the figures, lower frame channel 74 is a U-shaped member that accommodates the trolley chain 70 as it moves in either direction. The trolley chain 70 acts as an endless loop passing from the motor assembly, through the lower frame channel 74 and over the near end arch 29. The trolley chain 70 is coupled to the trolley assembly 62, which moves in conjunction with the trolley chain 70. The motor assembly 24 is supported by an upright member 78 which may be a single component or be constructed of multiple components to accommodate the gear train 66 and trolley chain 70. FIG. 6 is one illustration of a support structure, but other support structures will be obvious to persons of ordinary skill in the art.

The major components of the motor assembly 24 are shown in FIG. 6. The electric motor 61 is coupled to a torque limiting clutch 82, which is a safety feature in case the system encounters unexpected resistance during the closing or opening of the tarp 32. In the disclosed embodiment, the drive shaft (not shown) of the motor couples to the clutch 82. As transfer shaft 83 is coupled to the clutch 82 and to first gear 84. First gear 84 is connected to second gear 86 by means of a drive cable or drive chain 85. The drive chain 85 drives second gear 86. The ratio between gears 84 and 86 is chosen to deliver a predetermined amount of torque and rotational speed to the third gear 88. This ratio would be chosen in view of the forces needed to open and close the tarp 32, the strength and rotational speed of motor 61 and frictional forces between the various components. In the disclosed embodiment, the gear ration between the first gear 84 and second gear 86 is 3:1.

The third gear 88 is coupled to second gear 86. Third gear 88 is coupled to the trolley chain 70. The diameter of third gear 88 can be greater or less than second gear 86, and gives a person skilled in the art another opportunity to alter the gear ratio of the gear train 66 to accommodate the chosen motor 61 and the forces needed to be overcome. A first passive gear 90 and second passive gear 91 are used to place the trolley chain 70 in proper position relative to the motor assembly 24, the lower frame channel 74 and the near end arch 29. The third gear 88 should be sized precisely in relationship to the diameter of the drum in order to maintain the position of the shuttle 150 in relationship to the winding ratio of the tarp 32 around the drum 170. It should be carefully designed to allow for a loose (low friction) tarp tension during transition while becoming tight at the fully closed and open positions.

Figure 8:
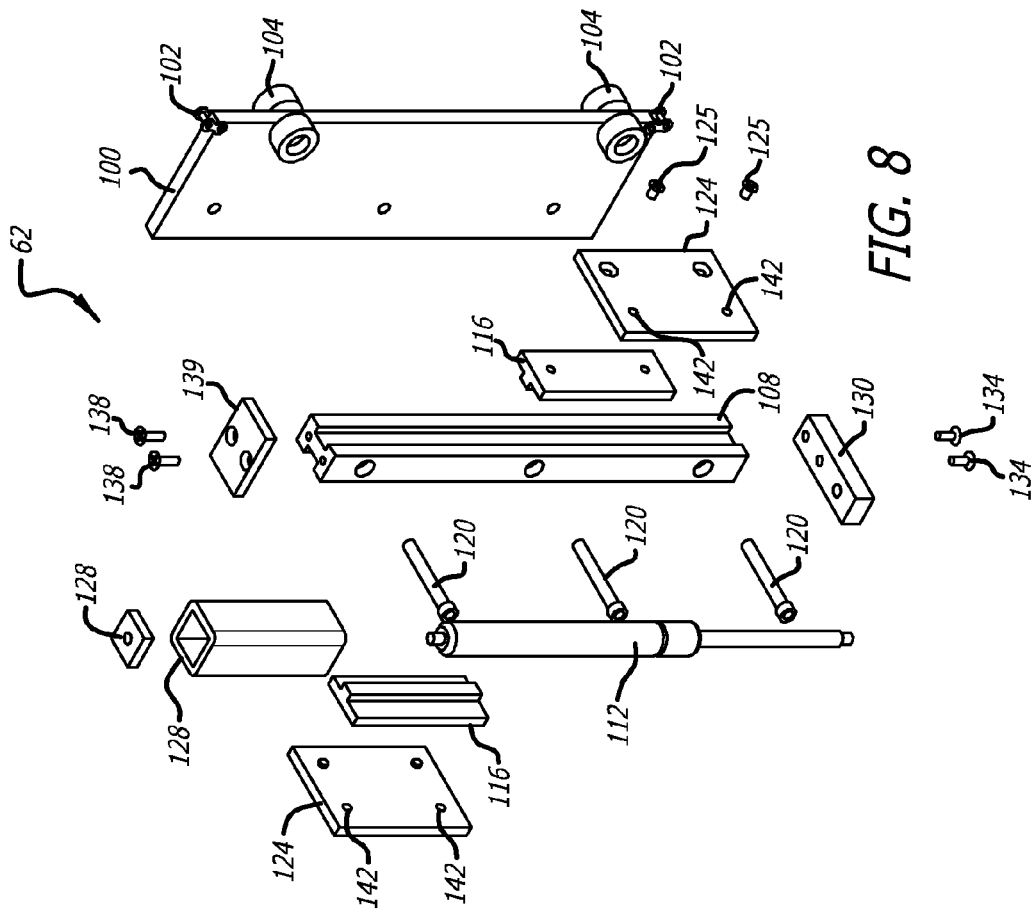
FIG. 8 is an exploded view of the trolley assembly showing the main components.
Figure 7:
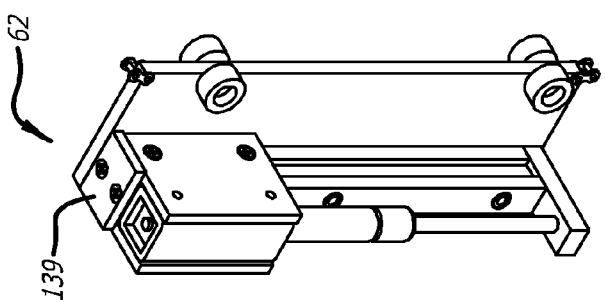
FIG. 7 is a perspective view of the trolley assembly.

FIG. 7 is a perspective view of the trolley assembly and FIG. 8 is an exploded view of the trolley assembly showing the main components. A trolley plate 100 has a plurality of trolley wheels 104, which in this embodiment consists of four wheels. The trolley wheels 104 ride on the near end arch 29. The trolley plate 100 is pulled by the trolley chain 70, which is attached to the trolley plate 100 by trolley chain links 102. In this embodiment, the trolley chain links 102 are at each end of the trolley plate 100. A rail 108 is secured to the trolley plate 100 by three rail bolts 120. A gas spring lower attachment 130 is secured to the rail 108 by lower attachment screws 134. It should be noted that bolts or screws could be replaced by other attachment means such as rivets or welds. A rail top plate 139 is attached to the rail with top plate attachment screws 138. Left and right shuttle receiving plates 124 are attached to left and right rail guide blocks 116 with fasteners 125. The rail guide blocks are moveable relative to the rail 108. A gas spring 112 is inserted into a gas spring upper attachment 128 and secured with an upper nut 140. Upper nut 140 is a captive nut immovably attached to the gas spring upper attachment 128. The upper nut 140 is unthreaded. The gas spring upper attachment 128 is held between the left and right shuttle receiving plates 124 by friction or by fasteners. The left and right shuttle receiving plates also include shuttle mounting holes 142. One end of the gas spring 112 is placed inside the gas spring upper attachment 128 and the other end is affixed into the gas spring lower attachment 130. As the trolley plate 100 moves along the near drive frame 48, it pulls the shuttle assembly 52. A rigid attachment of the shuttle assembly 52 to the trolley plate 100 is not preferred, so the gas spring 112 allows for a small amount of motion of the shuttle assembly relative to the trolley plate 100 and the trolley chain 70. The gas spring 112 can absorb vibration and minor bumps as might be caused by dirt on the near drive frame 48.

Figure 9:
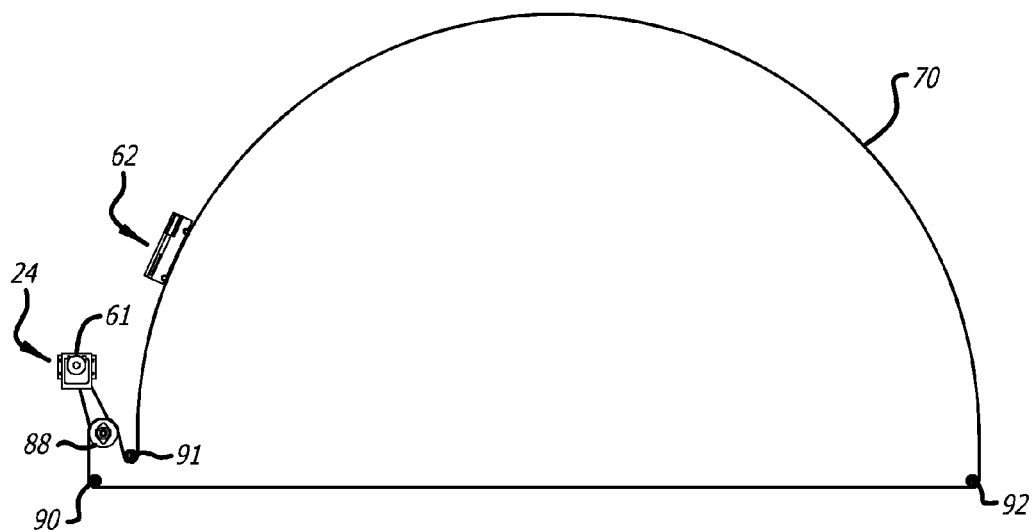
FIG. 9 is a schematic side view of the motor assembly and trolley assembly of FIG. 5 coupled to a trolley chain with the drive frame deleted.

FIG. 9 is a schematic side view of the motor assembly 24 and trolley assembly 62 of FIG. 5 coupled to a trolley chain 70 with the near drive frame 48 deleted. The figure shows the endless loop characteristic of the trolley chain 70. FIG. 9 also shows a third passive gear which is positioned near the end of the lower frame channel 74 opposite from the end where the first passive gear 90 is positioned. It can be seen from this figure that as the motor 61 moves the trolley chain 70 in one direction or the other, the trolley assembly 62 moves in conjunction with the trolley chain 70.

Figure 10:
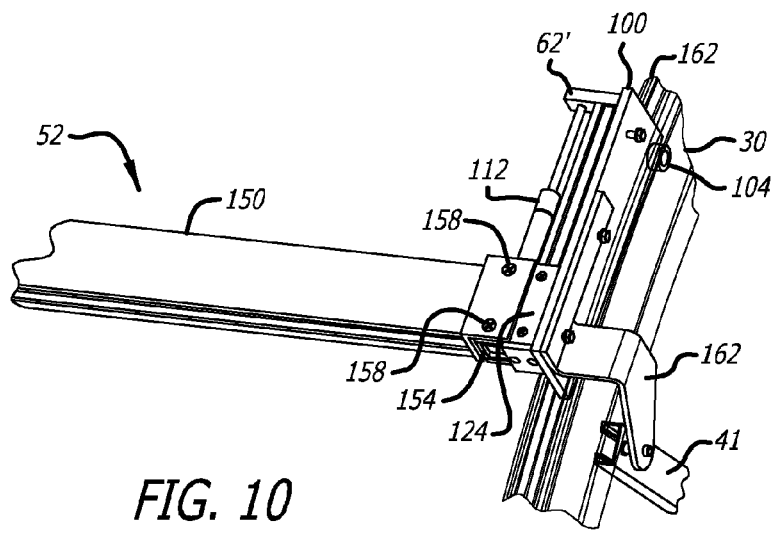
FIG. 10 is a perspective view, generally from the top, of the shuttle assembly and trolley assembly.

FIG. 10 is a perspective view, generally from the top, of the shuttle assembly 52 and a second trolley assembly 62' on the far end arch 30. The second trolley assembly 62' on the far end arch 30 is essentially a mirror image of the trolley assembly 62 on the near end arch 29. The arches 29 and 30 are essentially mirror images of each other. The shuttle assembly 52 includes a shuttle bar 150 to which is attached a shuttle bar mount 154. The shuttle bar mount 154 is attached to the left and right shuttle receiving plates 124 with screws 158. In this figure, the far end arch 30 has a ridge 162 that guides the trolley wheels 104 around the far end arch 29. The same construction is present on the near end arch 29. Connected to the trolley plate 100 is a tarp arm connector 162. As can be seen in FIG. 10, the tarp arm connector is coupled to far end tarp arm 41. An essentially similar construction is present to couple the near end tarp arm 43. It can also be seen in FIG. 10 that the gas piston 112 provides a degree of movement of the shuttle bar 150 relative to the trolley plate 100.

Figure 13:
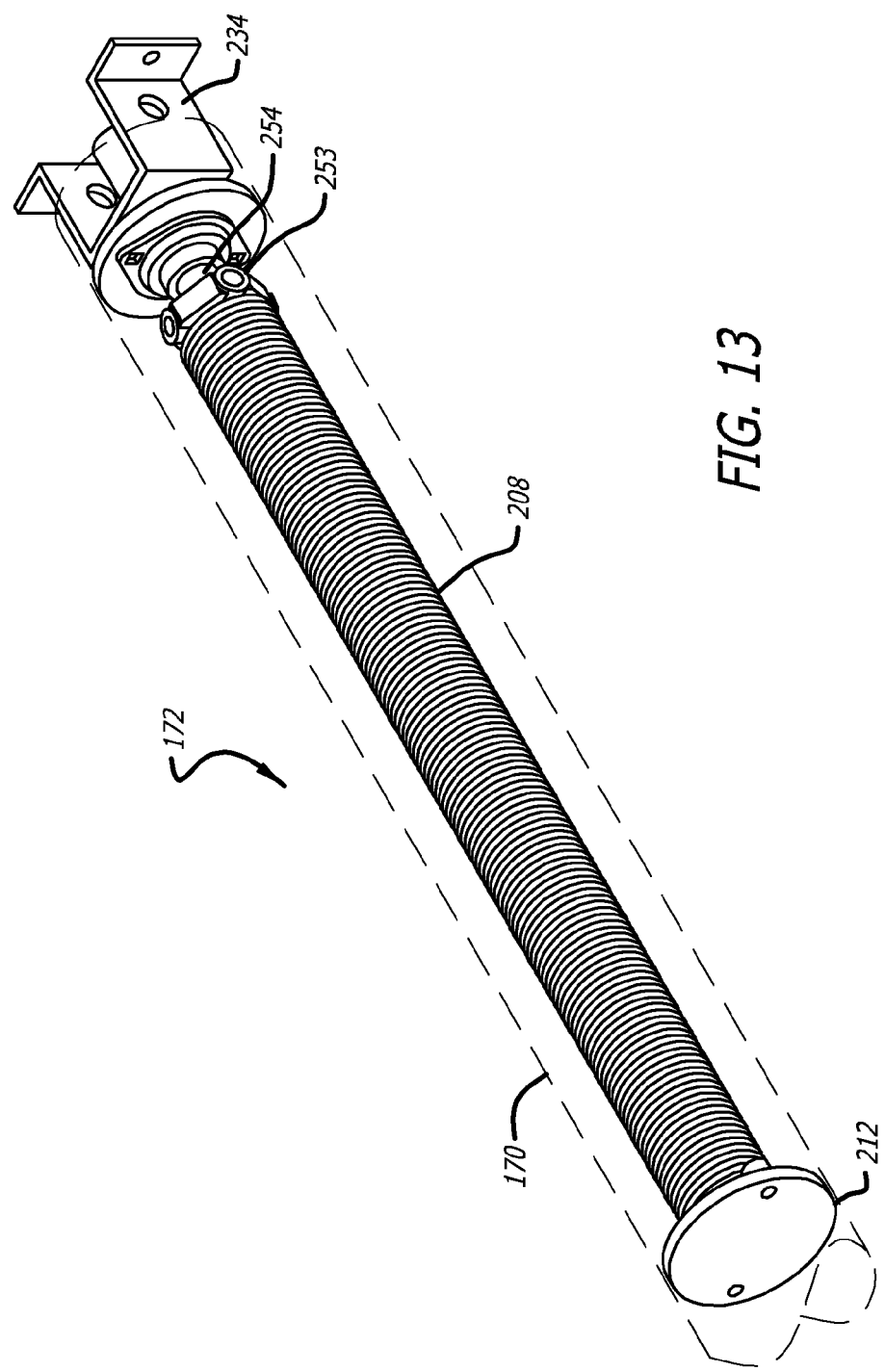
FIG. 13 is perspective view of the far end of the drum showing a spring assembly within the drum.

FIG. 11 is the drum assembly 54 of FIG. 4 shown in dashed lines with a detail of the drum near end 171 shown in FIG. 12 and a detail of the drum far end 172 shown in FIG. 13. The terms "near" and "far" have the same meanings as stated previously. "Near" means closer in proximity to the motor assembly 24 and "far" means farther in proximity to the motor assembly 24. The drum 170 has at the near end a drum plug 174 closing the near end of the drum and a drum coupler 178 attached to the drum plug 174. In this embodiment, the drum plug 174 is welded to the drum 170 and the drum coupler 178 is welded to the drum plug 174. The drum plug 174 couples to the drum drive 180 shown in FIG. 6. The drum drive 180 is coupled to the electric motor as explained in conjunction with FIG. 16.

Figure 16:
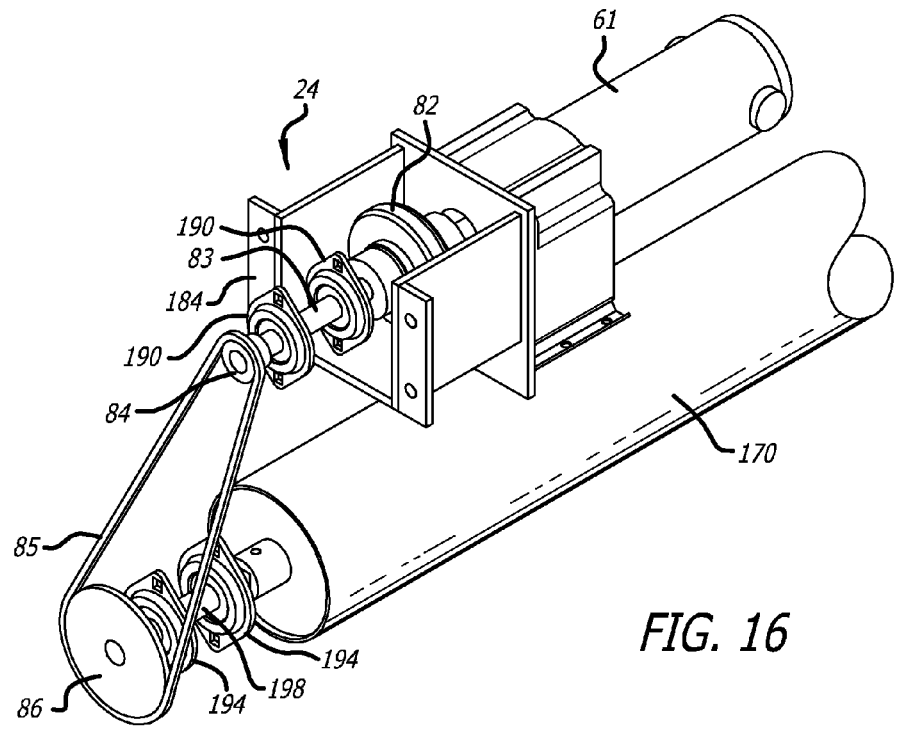
FIG. 16 is a perspective view of the motor assembly coupled to the drum coupler.

FIG. 16 depicts the motor assembly 24 and attachment bracket 184, which is attached to the upright member 78 with additional hardware that is not shown. Bearings 190 are also attached to the upright member 78 and provide support for the transfer shaft 83. The motor 61 transfers force to the drum drive shaft 198, which is supported by drum drive shaft bearings 194. Bearings 194 are attached to a second upright member 79 shown in FIG. 5. The motor force is transmitted to the drum drive shaft 198 via an assembly including the second gear 86, first gear 84 and drive chain 85. The drawings show the first and second gears 84 and 86 as not having teeth but, in practice, they may or may not have teeth depending on design choices. The drive chain 85 may be a typical commercially available chain or it may be a cable or belt depending on design choices. In the disclosed embodiment, the motor 61 and the second gear 86 have a 3:1 gear ratio. In FIG. 16, the third gear 88 is not shown for simplicity, but it is attached to the drum drive shaft 198 in between the two drum drive shaft bearings 194.

FIG. 13 is perspective view of the drum far end 172 showing a torsion spring 208 within the drum 170. A spring plug 212 is shown at the end of the torsion spring 208. The spring plug 212 is fixed to the end of the torsion spring 208 by a bolted fastener or other means. The spring plug 212 is also secured to the drum 170 by means of screws (not shown) passing through the drum 170 and into the periphery of the spring plug 212. The other end of torsion spring 208 is secured to a yoke sleeve 254 by a fitting 253. Additionally, the torsion spring 208 may be welded to the spring plug 212 and to the yoke sleeve 254. Yoke sleeve 254 is secured to the yoke 234, for example, by welding. Thus, the ends of torsion spring 208 are coupled to both the drum 170 and yoke 243. The torsion spring 208 is therefore wound or unwound in conjunction with rotational movement of the drum 170.

Figure 14:
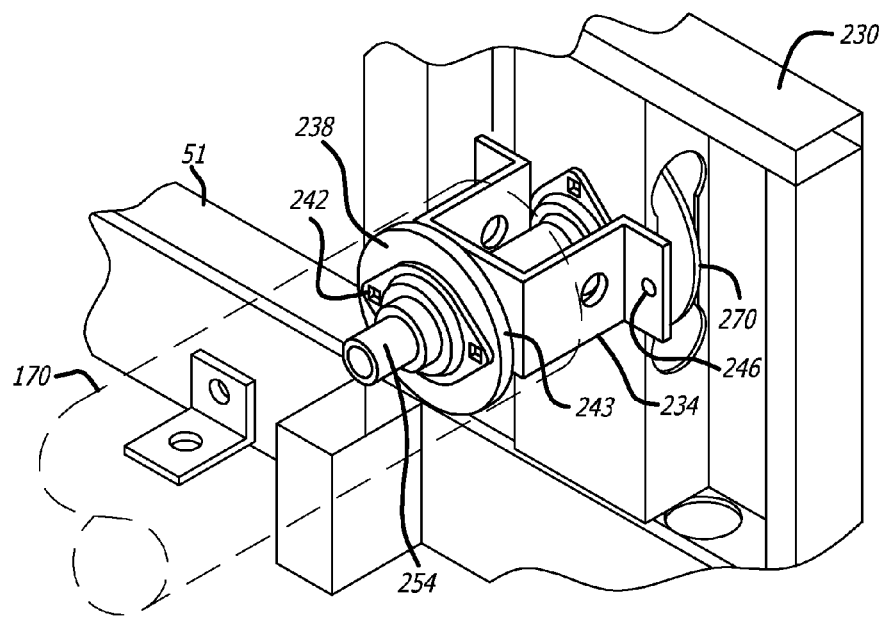
FIG. 14 is a perspective view of a support mechanism at the far end of the drum.

FIG. 14 is a perspective view of the support structure for the far end of drum 170. The support structure includes a yoke 234, yoke plug 238 and a rotational yoke bearing 242. The yoke 234 is attached to the far end weldment 230 with bolts or other fasteners such as screws, at a plurality of attachment points, one of which is shown as opening 246. The drum 170 is positioned over the yoke 234 and yoke plug 238 and secured to the yoke plug 238 by a fastener, such as a machine screw, at attachment point 243, which is indicated by a "+" on the figure. Additional attachment points may be added. The machine screw passes through a hole in the drum 170 aligned with the attachment point 243. This configuration allows the drum 170 to rotate about the yoke.

Figure 15:
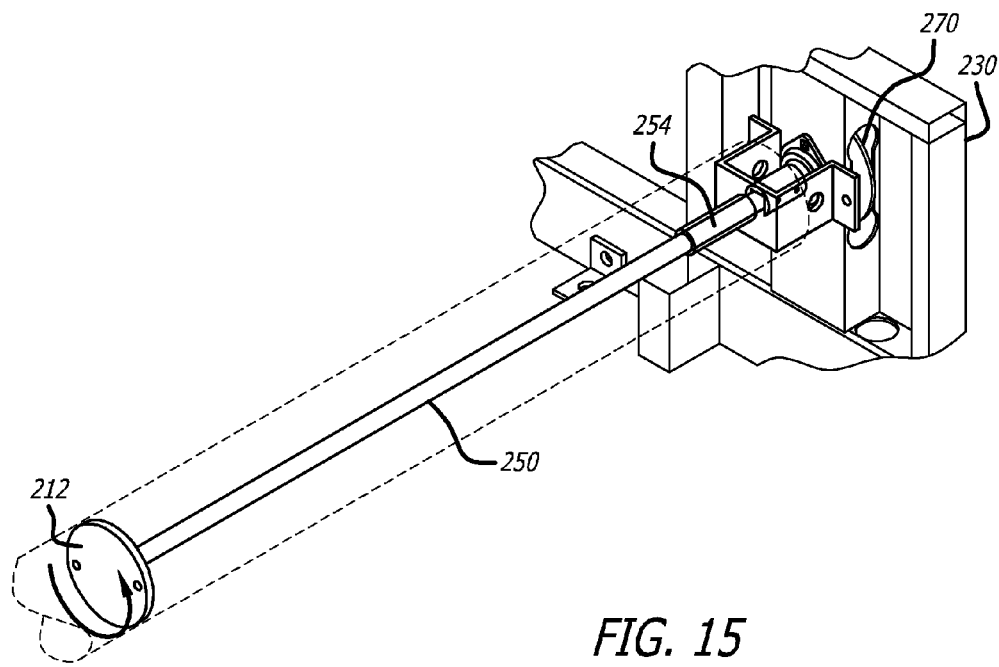
FIG. 15 is a perspective view of a shaft mechanism inside the spring of the spring assembly.

FIG. 15 is a perspective view of a shaft mechanism inside the torsion spring 208. The yoke bearing 242 and yoke plug 238 have been omitted from FIG. 15 to allow visualization of the internal components. Because of the structure described above, as the drum 170 rotates in either direction, the torsion spring shaft 250 also rotates and spring tension is either increased or decreased in the torsion spring 208. The torsion spring shaft 250 passes through yoke sleeve 254 in a sliding fit allowing the torsion spring shaft to rotate within the yoke sleeve 254. Yoke sleeve 254 is secured to the yoke 234, for example, by welding. As will discussed below, the far end weldment 230 will be replaced by extension weldment 216 and, in that embodiment, a drum drive shaft 324 will pass through the extension weldment 216 to be connected to a second automated canopy greenhouse. The structure of the second automated greenhouse is similar in many aspects as the automated greenhouse 1, except for certain modifications that will be discussed below.

FIGS. 14 and 15 show a fourth gear 270. The fourth gear 270 is connected to a second trolley chain (not shown.) The second trolley chain is connected to the second trolley assembly 62' in essentially the same way as the trolley assembly 62 in FIG. 9. The only significant difference is that there is no motor assembly associated with the second trolley chain and consequently no first gear 84 and no drive chain 85.

Figure 17:
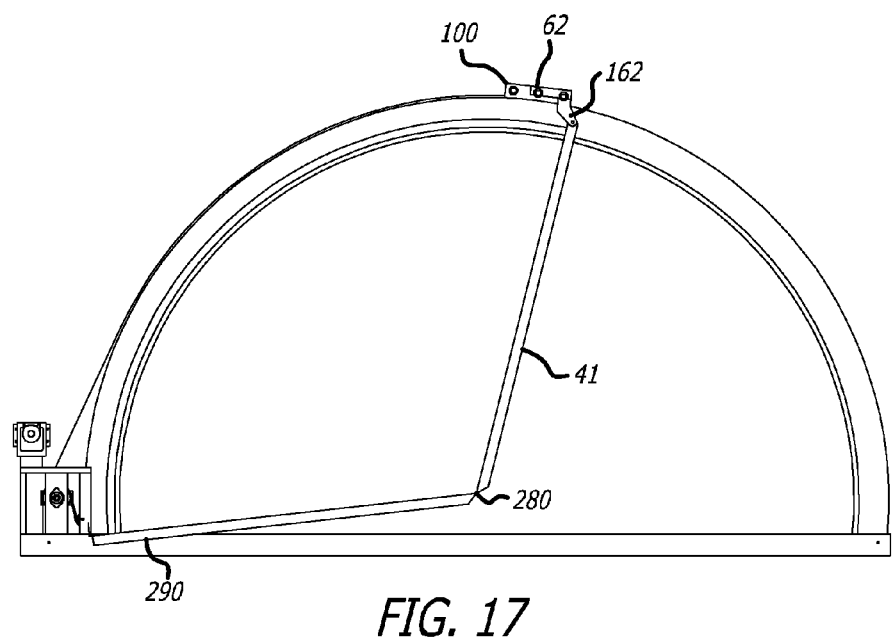
FIG. 17 is a depiction of the shuttle in a neutral position immediately preceding the step of pre-loading of the torsion spring.

FIG. 17 is a depiction of the far drive frame 50, far end base 51 and a trolley assembly of the same type as trolley assembly 62. A tarp arm connector 162 and far end tarp arm 41 are also shown. Please note that the tarp arm connector 162 may be affixed to any portion of the trolley plate 100. In other words, tarp arm connector 152 may be connected to the left, right or center of trolley plate 100 as the trolley plate is oriented in FIG. 17. In FIG. 17, the tarp arm connector is depicted at the right side of trolley plate 100. The far end tarp arm 41 ends at a pivot point 280. As shown in FIG. 17, the trolley assembly 62, the associated shuttle bar 150 and the far end tarp arm are in a neutral position. A shuttle bar 150 is connected to the trolley assembly 62 as described previously. The shuttle bar 150 is connected to a trolley assembly on the near end arch 29.

The initial set-up of automated canopy greenhouse 1 is as follows. The trolley assembly 62, the associated shuttle bar 150 and the far end tarp arm are set in a neutral position. One end of a curtain or tarp 32 is attached to the drum 170 using any suitable attachment means such as screws, rivets or bonding agents. The tarp 32 is partially rolled around the drum 170, leaving enough of the tarp 32 unrolled so that the remaining end of tarp 32 may be attached to the shuttle bar 150 using any suitable attachment means such as screws, rivets or bonding agents. At this point, the torsion spring 208 is unstressed. Next, the shuttle bar 150 and the associated trolley assemblies 62 and trolley chains 70 are moved back to the start position as depicted in FIG. 1. This process winds the tarp 32 around the drum 170 and pre-loads the torsion spring 208. This process of moving the shuttle bar 150 to the start position can be done using the motor 61 or manually. In normal operation, the tension in torsion spring 208 therefore assists the motor 61 in lifting the tarp 32 up to the neutral position. As the motor 61 continues to move the tarp 32 to the entirely closed position as depicted in FIG. 3, the torsion spring 208, with the assistance of gravity, loads the torsion spring 208 again, but in the opposite direction. The torsion spring 208 therefore assists the motor 61 in opening the tarp 32 from the closed position to the neutral position. As the motor 61 continues to open the tarp 32, the torsion spring 208, again with the assistance of gravity, loads the torsion spring 208 so that it may assist the motor 61 in closing the tarp 32 in the next cycle.

The torsion spring effect facilitates the operation of the automated canopy greenhouse 1. When the assembly is in its retracted or extended positions, the shuttle assembly 52, tarp 32, the other components and friction all add to the amount of torque that the motor 61 must produce. The torsion spring 208 counteracts this torque to act as if the assembly is essentially in the neutral position at all times. When the assembly is at or near its neutral position, the mass of the shuttle assembly 52 is carried by the trolley wheels 104 more than by the trolley chain 70. This greatly reduces the amount of torque that the motor 61 must produce, saving energy by consuming less current.

The near end tarp 42 and far end tarp 40 are essentially pie shaped. One end of each is connected to the near end tarp arm 43 and far end tarp arm 41 respectively. The other end of each pie shape is connected to a stationary arm (see FIG. 17). As the tarp 32 is opened and closed, the near end tarp 42 and far end tarp 40 are likewise opened and closed.

Figure 18:
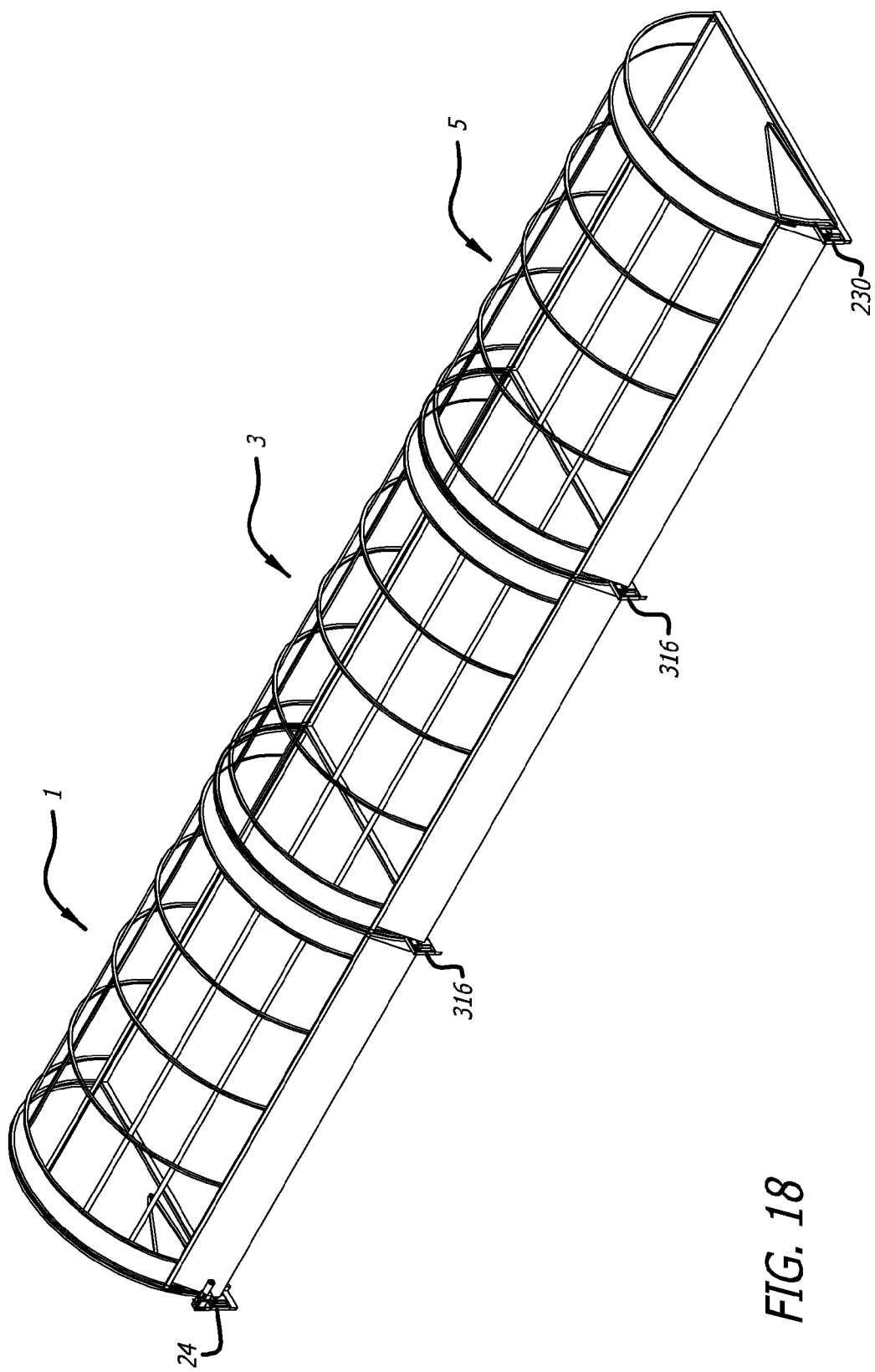
FIG. 18 is a perspective view of three automated greenhouse units of the type shown in FIG. 1 connected to form a long unit operable with a single motor.

FIG. 18 is a perspective view of three automated greenhouse units of the type shown in FIG. 1 connected to form a long unit operable by a single motor. This ability of the disclosed system to drive multiple greenhouse units 1 is made possible by the torsion spring 208 assembly as described herein, which allows the torsion spring 208 to provide forces in two directions. The structure of the extension feature will be discussed below.

Figure 19:
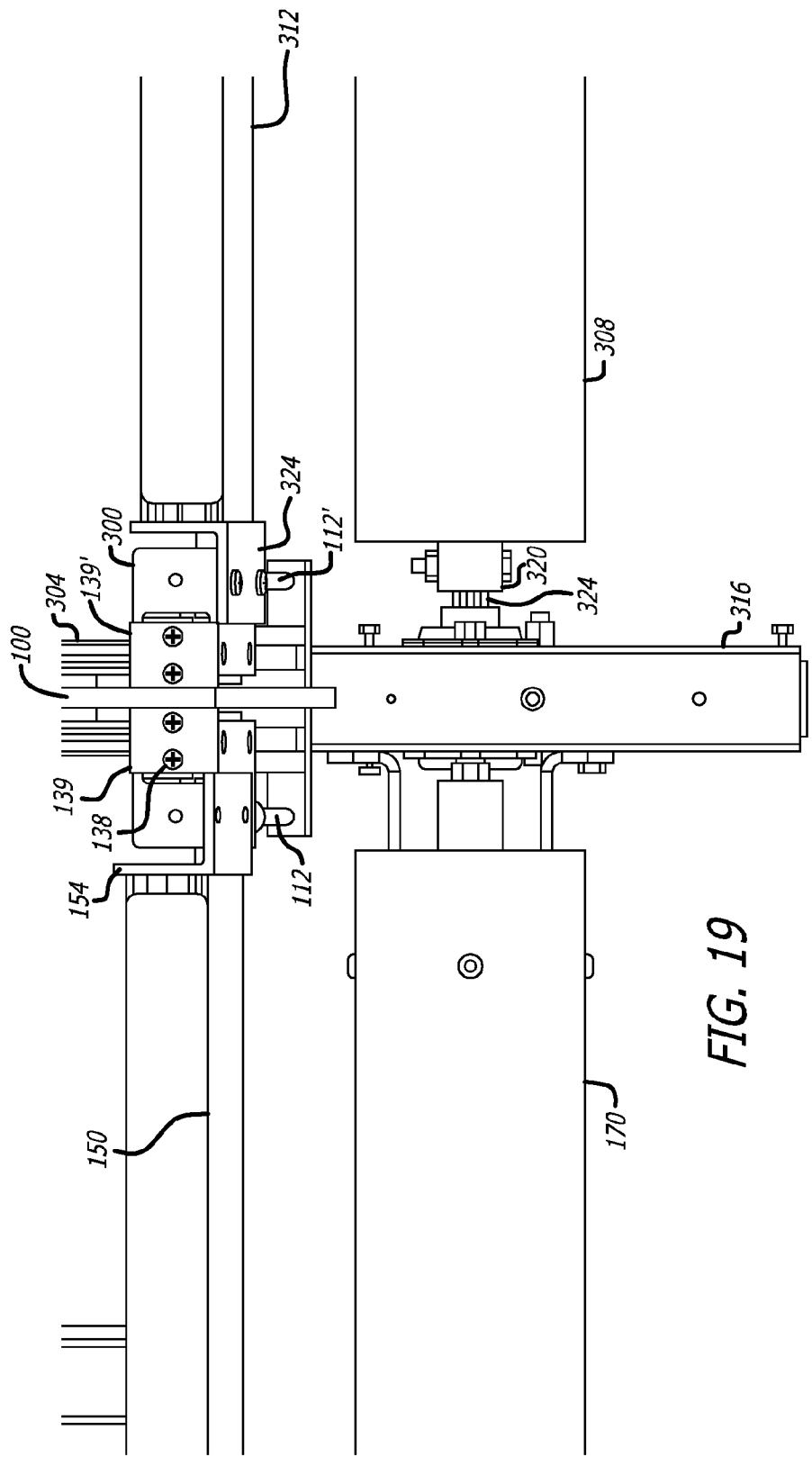
FIG. 19 is a top view of a portion of an extension drive mechanism.
Figure 21:
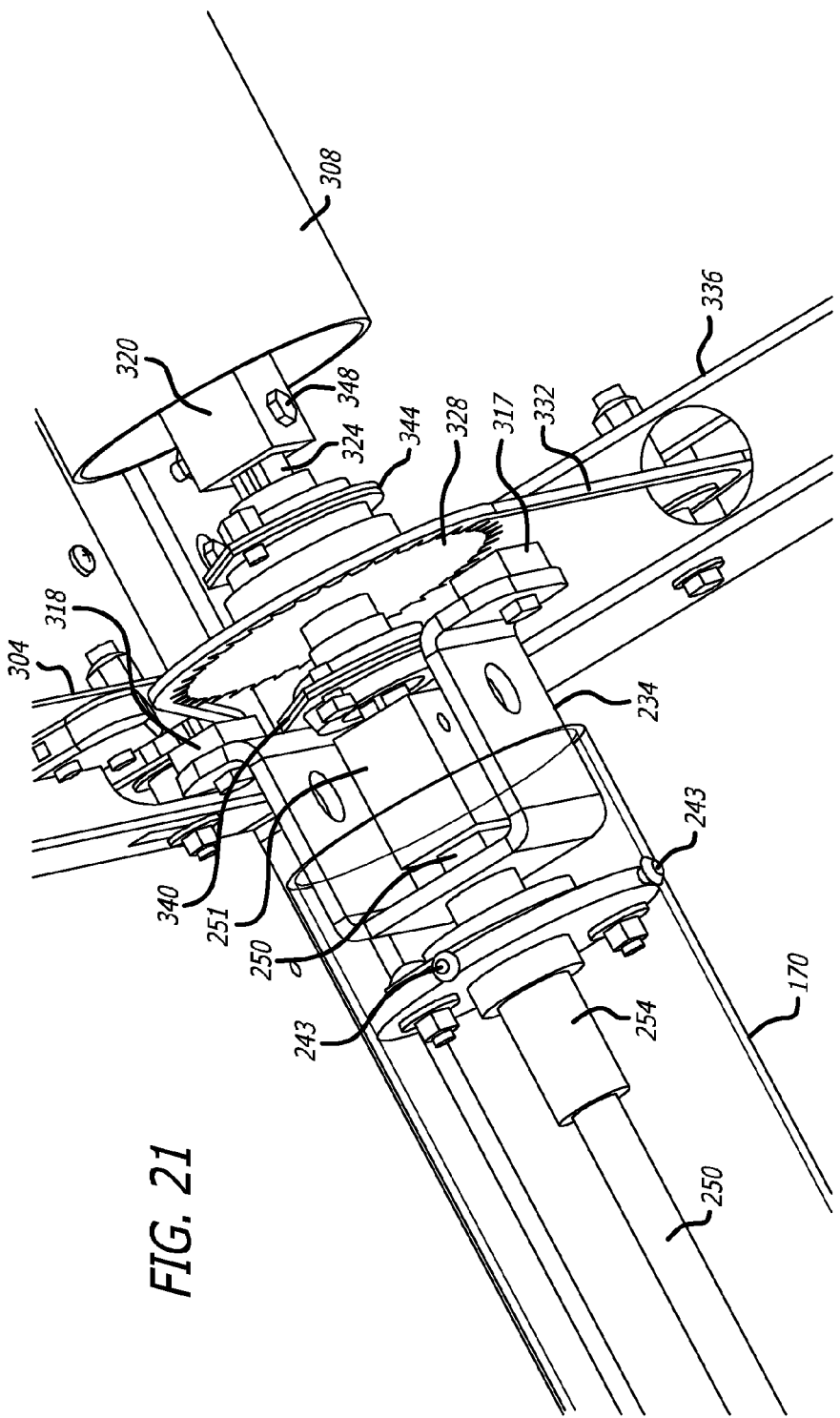
FIG. 21 is a perspective view of the interior of an extension weldment showing an extension drive gear and chain.

FIG. 19 is a top view of a portion of the extension drive mechanism. When adding a second greenhouse unit to first unit described above, the far end arch 30, far end tarp 40, far end tarp arm 41 and far end weldment 230 are removed. In their places are installed an extension drive frame 304, extension drive trolley 300 and extension weldment 316. Referring to FIG. 21, the extension weldment 316 (the outside of which has been removed from FIG. 21 to allow a view inside) includes an extension drum drive 324 which on the near end (the end nearest the motor assembly 24) is coupled to the torsion spring shaft 250 by a torsion spring shaft coupler 251. The shaft 250 has a circular cross section in this embodiment. However, the end of the torsion spring shaft 250 may also be squared off or splined. The interior of torsion spring shaft coupler 251 would have a mating cross section or grooves. The near end of the extension drum drive 324 is also inserted into the torsion spring shaft coupler 251. In this embodiment, the extension drum drive 324 has a square cross section, but other shapes could be used. The interior of the spring shaft coupler 251 is configured to mate with the extension drum drive 324. The extension drum drive 324 couples to the extension drum coupler 320, which is similar in operation to drum coupler 178. As can be seen in FIG. 21, the extension drum coupler 320 has a squared outside cross section, but it may have a circular OD similar to drum coupler 178. The shape of the OD may be varied as a design expedient. Extension drum 308 is constructed essentially the same as drum 170, having its own torsion spring mechanism.

Referring again to FIG. 19, the extension drive trolley 300 is similar in structure and operation as trolley assembly 62. However, it has two gas spring arrangements, one on each side of trolley plate 100. In other words, the structure depicted on the left side of trolley plate 100 in FIGS. 7 and 8 is duplicated on the right side of trolley plate 100 as a mirror image. For example, comparable to gas spring 112 on the left side there is a second gas spring 112' on the right side. Rail top plate 139 has a counterpart 139', and so forth. The terms "left" and "right" have their common meanings as the drawing is viewed with the "FIG. 19" designation right side up. Instead of a far end tarp arm 41 being connected to the trolley plate 100, an extension shuttle bar 312 is attached in a similar fashion as shuttle bar 150 is attached as depicted in FIG. 10.

Figure 20:
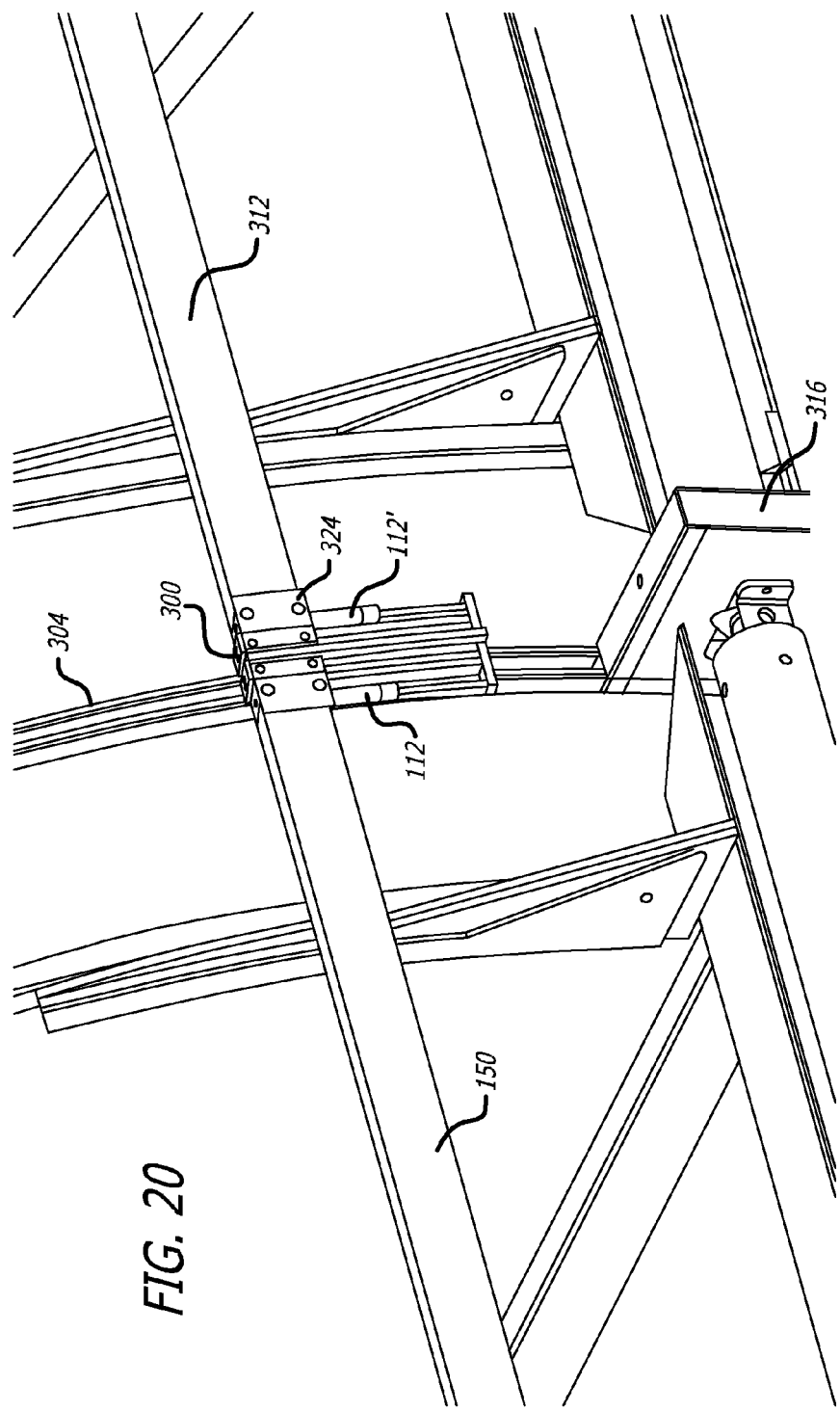
FIG. 20 is a perspective view of a portion of the extension drive frame, extension drive trolley and extension drive mechanism of FIG. 19 with the extension drive trolley having moved up the extension drive frame.

FIG. 20 is a perspective view of an extension drive trolley 300 and related structure after the trolley 300 has moved a short distance up the extension drive frame 300. A tarp is not attached to either shuttle bar 150 or 312 so that structural components are visible. The assembly of the basic structural components that are not discussed herein is not critical to an understanding of the invention and their design may be altered by persons of ordinary skill in the art.

Extension drive frame 304 functions in the same way as the far end arch 30, except that it can accommodate a wider extension drive trolley 300 and an extension weldment 316. Extension weldment 316 differs from far end weldment 230 in that it provides the ability to couple the torsion spring shaft 250 on the near side of the weldment 230 to extension drum drive 324 utilizing the spring shaft coupler 251 and extend the extension drum drive 324 through the extension weldment 316 and to the extension drum coupler 320 on the far side.

FIG. 21 is a perspective view of the interior of an extension weldment 316 showing an extension drive gear 328 and extension drive chain 332. Certain components are not shown, such as yoke bearing 242, in order to better see the remaining components. Comparing this structure with the structure in FIGS. 14 and 15, the fourth gear 270 has been replaced by extension drive gear 328 and serves the same function. The extension drive gear 328 is connected to the extension drive chain 332, which is connected to the extension trolley drive 300 in essentially the same way as the trolley assembly 62 in FIG. 9. In the embodiment under discussion, the extension base 336 replaces the far end base 51. Extension base 336 includes two passive gears in the relative same positions as in the far end base 51 where the passive gears are shown at numerals 90 and 92. As the extension drum drive 324 passes through the extension weldment 316, it is supported by first shaft bearing 340 and second shaft bearing 344. In the disclosed embodiment, each end of the extension drum drive 324 is given a square cross section and couples with the spring shaft coupler 251 on the near end and the extension drum coupler 320 on the far end. A bolt 348 secures the extension drum drive 324 to the extension drum coupler 320. Bolts may also be used to secure the torsion spring shaft 250 and the extension drum drive 324 to the spring shaft coupler 251. A very small portion of the extension weldment 316 is shown at numerals 317 and 318 to show the mounting of the yoke 234. The end of the lengthened torsion spring shaft 250 is given a square cross section and couples with the extension drum coupler 320. A bolt 348 secures the shaft 250 to the extension drum coupler 320. A very small portion of the extension weldment 316 is shown at numerals 317 and 318 to show the mounting of the yoke 234.

The far end of the second greenhouse has the same structure as the far end 8 of the first automated canopy greenhouse 1. However, a third and subsequent greenhouses may be added by replacing the far end weldment of a preceding greenhouse with an extension weldment and a subsequent greenhouse. Extension drum 308 includes a torsion spring shaft 250 and is connected to a far end weldment in the same manner that drum 170 attaches to the structure at far end weldment 230. The last greenhouse in the series will have a far end structure essentially the same as the structure described with respect to far end 8 of automated canopy greenhouse 1. When a plurality of automated canopy greenhouses are connected, the torsion springs are loaded in the same manner as described with respect to automated canopy greenhouse 1. The trolley assemblies, the associated shuttle bars and the far end tarp arm are set in a neutral position. The tarps are attached and the torsion springs are loaded as described above.

The motor 61 may be connected to a timer to open and close the automated canopy greenhouse 1, and any other automated canopy greenhouses that may be attached in series, at any chosen times. The motor may include torque sensors to sense whether the tarp and associated components have encountered an impediment upon opening or closing, and the sensors may be set to stop the motor and create an alert.

While the above description contains many specifics, these should not be construed as limitations on the scope of the disclosure, but rather as an exemplification of the embodiments therein. It is to be understood that the invention is not limited to these specific embodiments. Accordingly, the invention is not limited to the precise embodiments described in detail hereinabove. With respect to the claims, it is applicant's intention that the claims not be interpreted in accordance with the sixth paragraph of 35 U.S.C. §112 unless the term "means" is used followed by a functional statement. Further, with respect to the claims, it should be understood that any of the claims described below may be combined for the purposes of the invention.

We claim:

1. A canopy system for covering growing vegetation over a coverage area comprising:
   a canopy support structure having four sides and resting at or near the ground level of the vegetation and encompassing an approximately rectangular coverage area;
   an approximately semicircular near drive frame at one side of the canopy support structure;
   an approximately semicircular far drive frame at a second side of the canopy support structure opposite to the near drive frame;
   a first trolley assembly riding on the near drive frame;
   a second trolley assembly riding on the far drive frame;
   a shuttle bar attached to the first and second trolley assemblies;
   said shuttle bar being approximately horizontal to the ground;
   a drum along a third side of the canopy support structure;
   a tarp at least partially wound around the drum;
   the tarp having a leading edge;
   the leading edge attached to the shuttle bar;
   a motor coupled to a trolley chain for moving said first and second trolley assemblies along said near and far drive frames;
   wherein when the first and second trolley assemblies move on the near and far drive frames the shuttle moves the tarp leading edge along an approximately hemispherical path; and, a torsion spring assembly coupled to the shuttle bar for balancing the load of the shuttle bar, first and second trolley assemblies and tarp.

2. The canopy system of claim 1 wherein said motor is configured to drive said first and second trolley assemblies in a first closing direction and a second opening direction.

3. The canopy system of claim 1 wherein the torsion spring is positioned inside the drum.

4. The torsion spring assembly of claim 1 wherein:
   the torsion spring is configured to be loaded in a first direction when the tarp is in an open position and said torsion spring is configured to be loaded in a second direction when the tarp is in a closed position; and,
   said torsion spring when loaded in the first direction urges the tarp toward the closed position and said torsion spring when loaded in the second direction urges the tarp toward the open position.

5. The first and second trolley assemblies of claim 1 wherein at least one of the trolley assemblies includes a shock absorber.

6. The first and second trolley assemblies of claim 1 wherein at least one of the trolley assemblies includes a plurality of wheels, said wheels riding on an upper surface of its associated drive frame.

7. A canopy system for covering growing vegetation over a coverage area comprising:
   a first canopy support structure having four sides and resting at or near the ground level of the vegetation and encompassing an approximately rectangular coverage area;
   an approximately semicircular near drive frame at one side of the first canopy support structure;
   a second canopy support structure having four sides and resting at or near the ground level of the vegetation and encompassing an approximately rectangular coverage area, said second canopy support structure located at a second side of the first canopy support structure opposite to the near drive frame of the first canopy structure;
   a connector frame positioned between the first canopy support structure and the second canopy support structure;
   a first trolley assembly riding on the near drive frame of the first canopy structure;
   a second trolley assembly riding on the far drive frame of the second canopy structure;
   a third trolley assembly riding on the connector frame;
   a first shuttle bar attached to the first trolley assembly and the third trolley assembly;
   a second shuttle bar attached to the third trolley assembly and the second trolley assembly;
   said first and second shuttle bars being approximately horizontal to the ground;
   a first drum along a third side of the first canopy support structure;
   a second drum along a side of the second canopy support structure in line with the first drum;
   a first tarp at least partially wound around the first drum;
   a second tarp at least partially wound around the second drum;
   the first tarp having a first leading edge and the second tarp having a second leading edge;
   the first leading edge is attached to the first shuttle bar and the second leading edge is attached to the second shuttle bar;
   a motor coupled to a trolley chain for moving said first and second trolley assemblies along said near and far drive frames;
   wherein when the first, second and third trolley assemblies move on their respective frames the first and second shuttles move the first and second tarp leading edges along an approximately hemispherical path;
   a first torsion spring assembly coupled to the first shuttle bar for balancing the load of the first shuttle bar, the first and third trolley assemblies and first tarp; and
   a second torsion spring assembly coupled to the second shuttle bar for balancing the load of the second shuttle bar, the second and third trolley assemblies and the second tarp.

8. The first and second torsion spring assemblies of claim 7 wherein:
   the torsion springs are configured to be loaded in a first direction when the tarps are in an open position and said torsion springs are configured to be loaded in a second direction when the tarps are in a closed position; and,
   said torsion springs when loaded in the first direction urge the tarps toward the closed position and said torsion springs when loaded in the second direction urge the tarps toward the open position.

9. The first, second and third trolley assemblies of claim 7 wherein at least one of the trolley assemblies includes a shock absorber.

10. The first, second and third trolley assemblies of claim 7 wherein at least one of the trolley assemblies includes a plurality of wheels, said wheels riding on an upper surface of its associated drive frame.

11. The canopy system of claim 7 wherein the first drum is coupled to the second drum, said motor is coupled to at least one of said drums, said motor driving the first and second drums and the first, second and third trolley assemblies.

* * * * *